United States Patent
Nakajima et al.

[11] Patent Number: 6,134,523
[45] Date of Patent: Oct. 17, 2000

[54] CODING BIT RATE CONVERTING METHOD AND APPARATUS FOR CODED AUDIO DATA

[75] Inventors: Yasuyuki Nakajima, Kawaguchi; Kiyono Ujihara, Chofu; Akio Yoneyama, Hoya, all of Japan

[73] Assignee: Kokusai Denshin Denwa Kabushiki Kaisha, Tokyo-To, Japan

[21] Appl. No.: 08/988,101

[22] Filed: Dec. 10, 1997

[30] Foreign Application Priority Data

Dec. 19, 1996 [JP] Japan ..................... 8-353868

[51] Int. Cl.[7] ............... G10L 21/04; G10L 19/00
[52] U.S. Cl. ................. 704/229; 704/501; 704/500
[58] Field of Search ........................ 704/229, 501, 704/500

[56] References Cited

U.S. PATENT DOCUMENTS

| | | | |
|---|---|---|---|
| 4,718,087 | 1/1988 | Papamichalis | 704/229 |
| 5,185,800 | 2/1993 | Manhieux | 704/229 |
| 5,353,375 | 10/1994 | Goto et al. | 704/229 |
| 5,375,189 | 12/1994 | Tsuitsui | 704/229 |
| 5,537,510 | 7/1996 | Kim | 704/229 |
| 5,625,743 | 4/1997 | Fiocca | 704/229 |
| 5,649,053 | 7/1997 | Kim | 704/229 |
| 5,659,660 | 8/1997 | Plenge et al. | 704/229 |
| 5,721,806 | 2/1998 | Lee | 704/229 |

Primary Examiner—David R. Hudspeth
Assistant Examiner—Daniel Abebe
Attorney, Agent, or Firm—Lackenbach Siegel Marzullo Aronson & Greenspan

[57] ABSTRACT

Coding bit rate converting method and apparatus for coded audio data are disclosed to convert input coded audio data to output coded data of a coding bit rate lower than a target coding bit rate. A control output is taken out when the frame size of the input coded audio data is larger than the frame size determined by the target coding bit rate, and the output coded data is provided as a converted output by controlling parameters defining the frame size of the input coded audio data by the use of the control output in a predetermined procedure until the frame size of the input coded audio data becomes smaller than the frame size determined by the target coding bit rate.

22 Claims, 5 Drawing Sheets

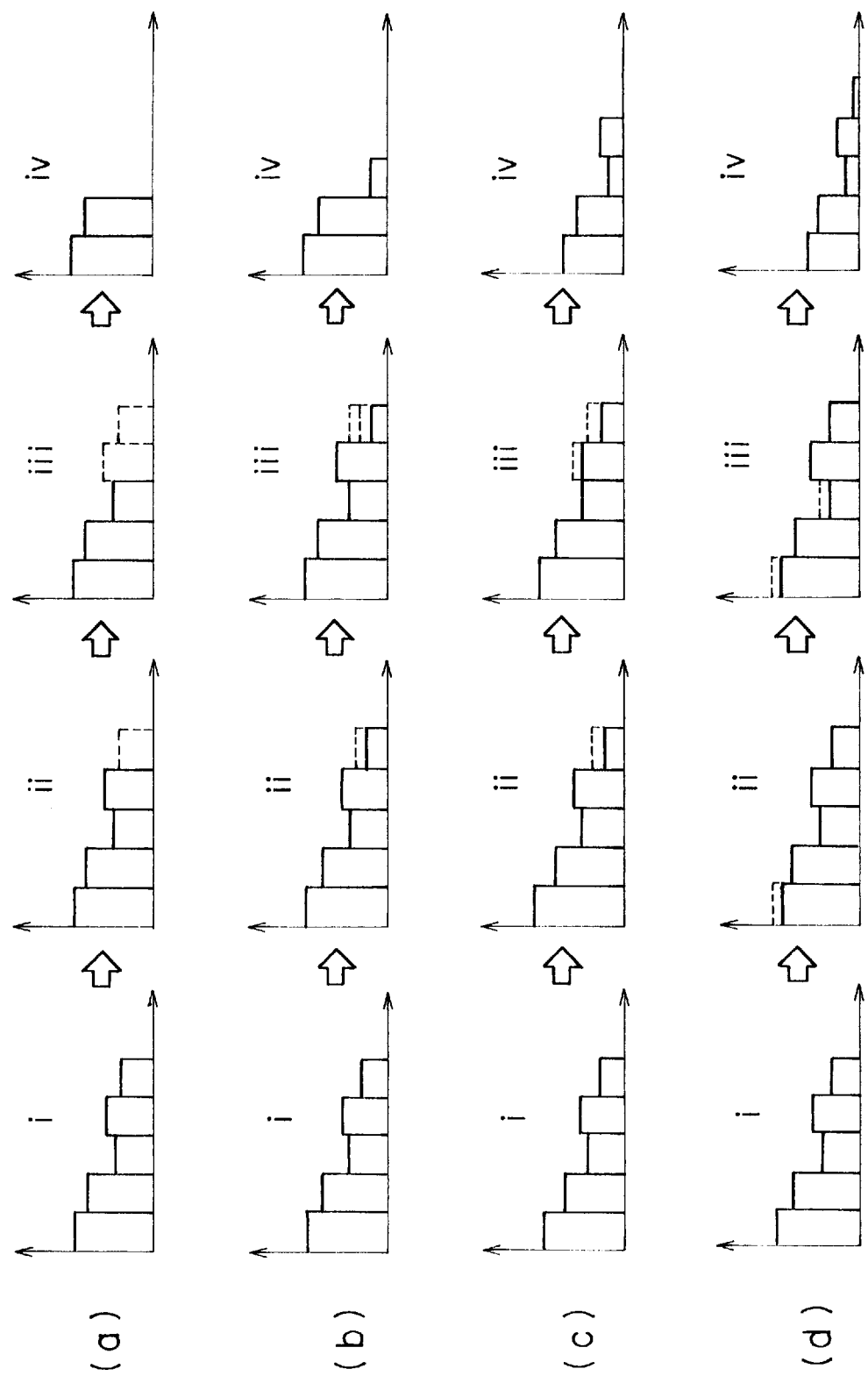

CODING BIT RATE CONVERTING METHOD AND APPARATUS FOR CODED AUDIO DATA

BACKGROUND OF THE INVENTION

The present invention relates to a method and device for converting the bit rate of coded voice data and, more particularly, to a method and apparatus for converting the bit rate of coded audio data which are used with a device for recording, transmitting or reproducing digital speech.

Prior art examples of high efficiency audio coding techniques are standard audio coding systems proposed by JTC (Joint Technical Committee) of ISO (International Organization for Standardization) and IEC (International Electrotechnical Commission), that is, MPEG1 Audio (Moving Picture Expert Group) and MPEG2 Audio. Coded by the MPEG Audio system, the voice or speech sound signal is converted to data of a transmission rate substantially in the range of 32 to 448 kbit/s according to its audio quality, and the coded data is stored in a computer hard disk or transmitted via LAN (Local Area Network).

On the other hand, transmission lines of the Internet and ISDN can be used at various transmission rates according to each line traffic or each transmission speed contracted; hence, there is also a demand for audio data transmission at various transmission rates. To meet with this demand, a technique is required, for example, to decode once-stored coded data to reproduce original audio signal and encode it again in accordance with the required transmission rate.

FIG. 6 shows an example which employs an ordinary coder and an ordinary decoder to satisfy the above-mentioned demand. As shown in FIG. 6, data coded at a coding bit rate R1 and input via a coded data input terminal 11, is provided as a speech signal and as coded information at outputs 18 and 19 of a decoding section 13, respectively. These outputs and a target coding bit rate R2 via an input terminal 12 are input into a coding section 1A, from which coded data newly converted to the coding bit rate R2 is provided at a coded data output terminal 1K.

At present there is no established technique of directly converting coded audio data to a required coding bit rate; hence, it is conventional to use a method for reconstructing an audio signal from coded audio data and encoding it again at the required coding bit rate. For example, in the MPEG audio, however, very high level processing is required for fast processing of convolutions by a subband analysis filter band which make up a majority of the computational load involved in coding and decoding processes. The conventional method has another disadvantage such that since a psycho-acoustic analysis is carried out again on audio data decoded from coded data, the audio quality is likely to be degraded by targeting of deteriorated coded audio data different from an original audio data.

SUMMARY OF THE INVENTION

An object of the present invention is to provide coding bit rate converting method and apparatus for coded audio data which obviate the afore-mentioned problems of the prior art and maintains the same level of performance as the conventional scheme through the use of means simpler than in the past.

To attain the above objective, the method of the present invention is a method for converting input coded audio data to output coded data of a coding bit rate lower than a target coding bit rate, the method being characterized in:

that control output is taken out when the frame size of the input coded audio data is larger than the frame size determined by the target coding bit rate; and that the output coded data is provided as a converted output by controlling a parameter defining the frame size of the input coded audio data by the use of the control output in a predetermined procedure until the frame size of the input coded audio data becomes smaller than the frame size determined by the target coding bit rate.

The apparatus of the present invention is an apparatus for converting input coded audio data to output coded data of a coding bit rate lower than a target coding bit rate, the apparatus being characterized by:

comparison means for taking out a control output when the frame size of the input coded audio data is larger than the frame size determined by the target coding bit rate; and converting means for providing the output coded data, as a converted output by controlling a parameter defining the frame size of the input coded audio data by the use of the control output in a predetermined procedure until the frame size of the input coded audio data becomes smaller than the frame size determined by the target coding bit rate.

The present invention can be carried out in the following modes.

(1) A coding bit rate converting method or apparatus which is characterized in that coded audio data is converted to data of a target coding bit rate by reconstructing the bit configuration of the coded audio data to eliminate a high-frequency subband without reconstructing the original audio signal.

(2) A coding bit rate converting method or apparatus which is characterized in that coded audio data is converted to a reduced amount of data coded at a target coding bit rate by requantizing the coded audio data in descending order of subband frequency without reconstructing the original audio signal.

(3) A coding bit rate converting method or apparatus which is characterized in that coded audio data is converted to a reduced amount of data coded at a target coding bit rate by requantizing, through the use of a mask-to-noise ratio, the coded audio data in descending order of subband frequency without reconstructing the original audio signal.

(4) A coding bit rate converting apparatus for coded audio data in (2) or (3) which is provided with means for dequantizing the coded audio data, means for requantizing the dequantized coded audio data, and quantization control means for controlling the quantization step necessary for the requantization.

The present invention permits conversion of the coding bit rate of input coded audio data without restoring it to the original audio signal, and hence it allows fast coding bit rate conversion of coded data. Further, the reduction of the computational complexity or load makes it possible to construct the apparatus of the invention with a simple structure and at a low cost as compared with conventional apparatus.

BRIEF DESCRIPTION OF THE DRAWINGS

The present invention will be described in detail below with reference to the accompanying drawings, in which:

FIG. 5 illustrates diagrams explanatory of general processing for reduction of the bit allocation in the present invention.

DETAILED DESCRIPTION OF THE INVENTION

The present invention is applicable to any audio coding systems, but the invention will be described as being applied to the MPEG audio coding system. The MPEG system divides the input audio signal into thirty-two frequency bands (subbands) and assigns thereto independent quantization steps for coding. The value of each subband is represented by information such as a sample value, a scale factor and the number of bits assigned to the subband.

(Embodiment 1)

Figure 1:
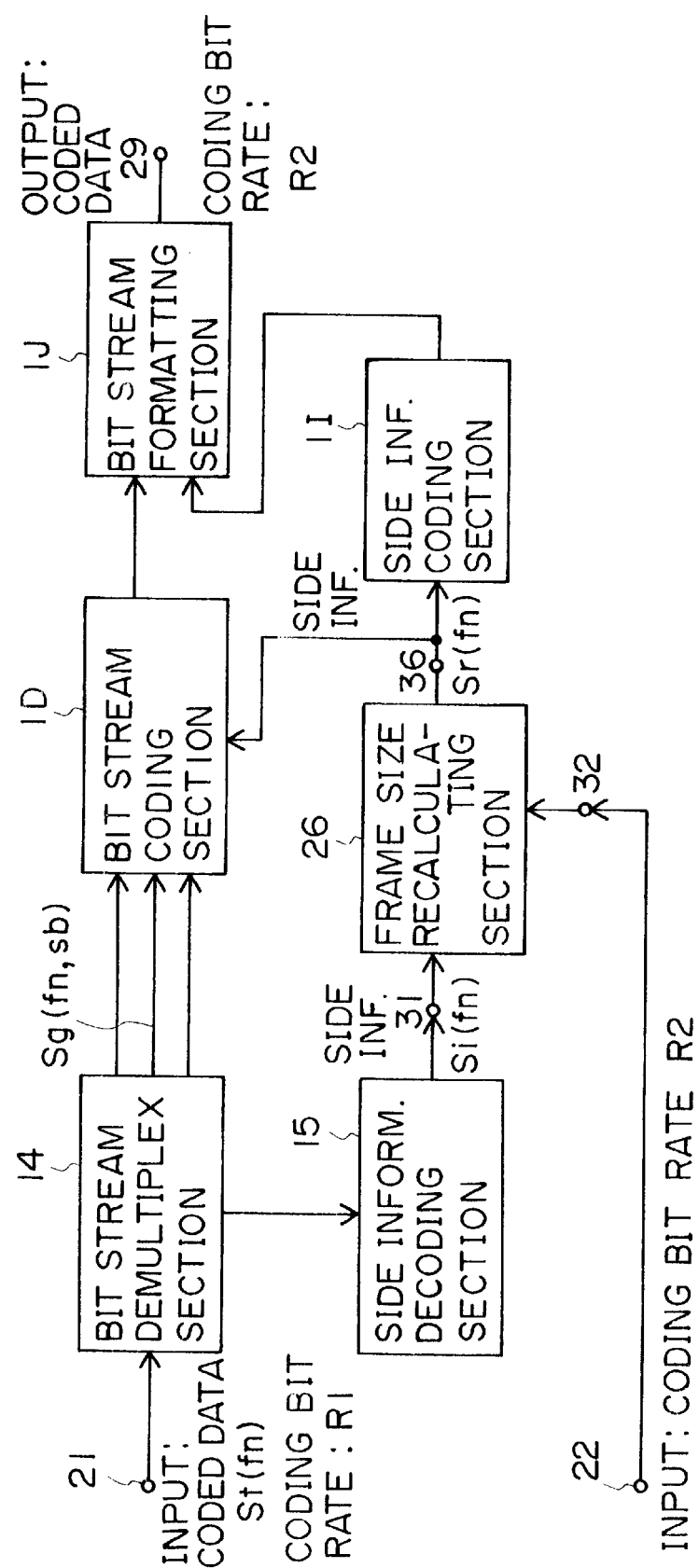
FIG. 1 is a block diagram illustrating circuit structure for use in first and third embodiments of the coding bit rate converting apparatus according to the present invention.

FIG. 1 is a block diagram for illustrating a first embodiment of the bit rate converting apparatus according to the present invention. Audio data St(fn) coded at a coding bit rate R1 is input via a coded data input terminal 21, where a notation fn indicates the number of each of frames into which a audio stream is divided in a fixed size. To begin with, the input data is subjected to a bit stream demultiplexing in a bit string demultiplexing section 14 to obtain a code stream indicating signal information Sg(fn,sb) of each band represented in bit form and of side information such as bit allocation Ba(fn,sb) of each band associated with the signal information. The code string representing the side information is decoded by a side information decoding section 15 into side information. In the above, the notation sb denotes the band number of each of the thirty-two subbands into which the MPEB audio data are divided, and the numbers 0 through 31 are assigned to the bands in ascend ing order of frequency.

Based on the decoded bit allocation information and a coding bit rate R2 input via a target coding bit rate input terminal 22, a bit allocation Br(fn,sb) for each band, which satisfies the coding bit rate R2, is calculated in a frame size recalculating section 26 (described later in detail). The bit allocation information Br of each band thus obtained and coding information of the original coded audio data are used to produce, in a side information coding section 1I, a code string representing new side information of coded audio data.

The bit-representing signal information Sg(fn,sub) of each band, obtained in the bit stream dissolving section 14, is provided to a bit stream coding section ID, wherein the signal information is updated in each coded form based on the bit allocation information Br(fn,sb) of each band. Then, in a bit stream formatting section 1J the updated signal information and previously coded side information are constituted into a code string of the frame structure, which is output via a coded data output terminal 29.

Incidentally, the bit stream demultiplexing section 14 and the side information decoding section 15 can adopt the same system as that used in a decoder pursuant to the MPEG system. The bit stream coding section 1D, the side information coding section 1I and the bit stream formatting section 1J can use the same system as that used in the encoder 1A pursuant to the MPEG system.

Figure 2:
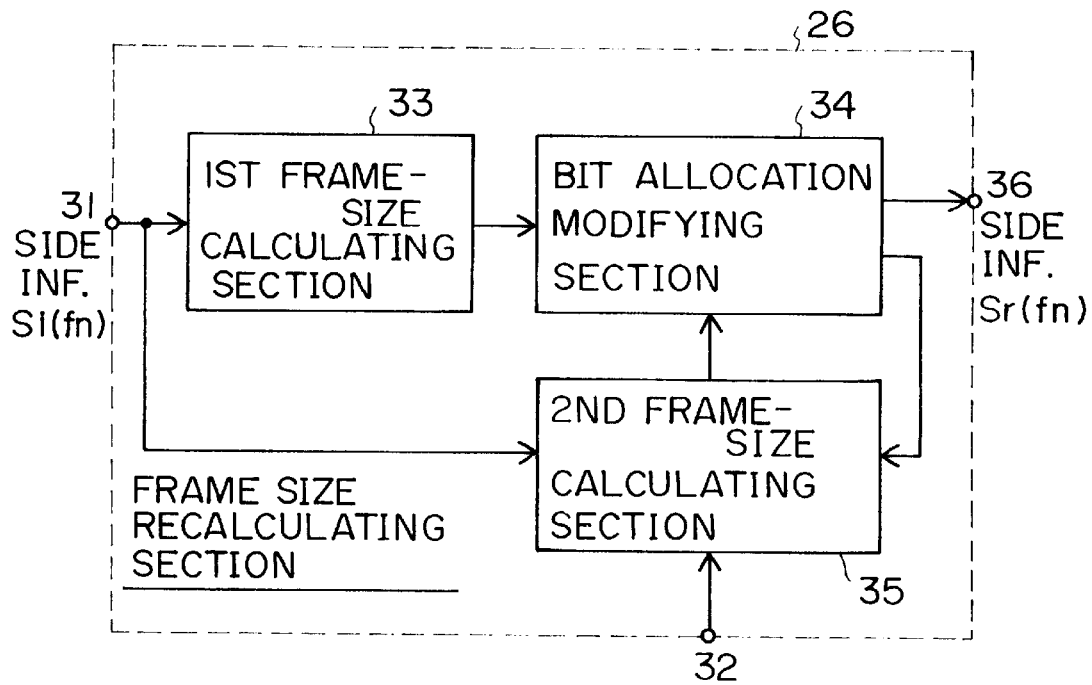
FIG. 2 is a block diagram illustrating in detail the configuration of a frame size recalculating section adoptable in first, second, fifth and sixth embodiments of the present invention.

FIG. 2 is a block diagram showing in detail the frame size calculating section 26 in the first embodiment. In FIG. 2 the same reference numerals as those in FIG. 1 denote parts identical or similar to those in the latter. It is side information Si(fn), such as coding conditions of input coded audio data, that is fed to a side information input terminal 31 in FIG. 2. This side information contains, for instance, bit allocation information Ba(fn, sb) on each band of the currently processed frame prior to the coding bit rate conversion. The current frame size Sa is calculated from the side information Si(fn) in a first frame size calculating section 33 and output therefrom together with the side information Si(fn). In a second frame size calculating section 35, a target frame size Sb is calculated from the side information input via the input terminal 31 and the target coding bit rate R2 input via an input terminal 32.

A bit allocation modifying section 34 compares the current frame size Sa with the target frame size Sb input thereinto.

When Sa≦Sb, it is assumed that bit allocation information has been modified for conversion to the target coding bit rate, and the updated bit allocation information Br(fn,sb) of each band and the associated side information are updated, and side information Sr(fn) is output via an output terminal 36.

When Sa>Sb, the current frame size is larger than the frame size in the case of the target coding bit rate R2, and consequently the frame size needs to be further reduced. In this instance, bit allocation information Ba(fn,sb), obtained by updating the bit allocation of the highest-frequency one of the bit-allocated bands to zero, is input into the second frame size calculating section 35, wherein the frame size is calculated again (i→ii in FIG. 5(a)).

When Sa≦Sb as the result of the calculation, it is assumed that bit allocation process has been completed, and the updated side information Sr(fn) is output via the side information output terminal 36. If the result of the calculation is Sa>Sb, the frame size needs to be further decreased and processing is performed to change the bit allocation of the highest-frequency one of the currently bit-allocated bands to zero. Then, the updated bit allocation information Ba(fn,sb) is input again into the second frame size calculating section 35 for recalculation of the frame size (ii→iii in FIG. 5(a)). This processing is repeated as long as Sa>Sb. Accordingly, the bit allocations to the respective bands are reduced in a descending order of frequency.

In this first embodiment, the coding bit rate can be converted without decoding compressed coded information to the reconstructed audio signal as in the prior art. Hence, there is no need of subband synthesis and analysis processing which involve large computational complexities in decoding and coding processes. Moreover, since a change in the number of quantization steps for each band does not accompany the bit allocation modification, coded audio data need not be dequantized nor requantized. Hence, the computational cost is sufficiently lower than in the past. This permits efficient processing even if a calculator of high calculation performance is not used.

(Embodiment 2)

Figure 3:
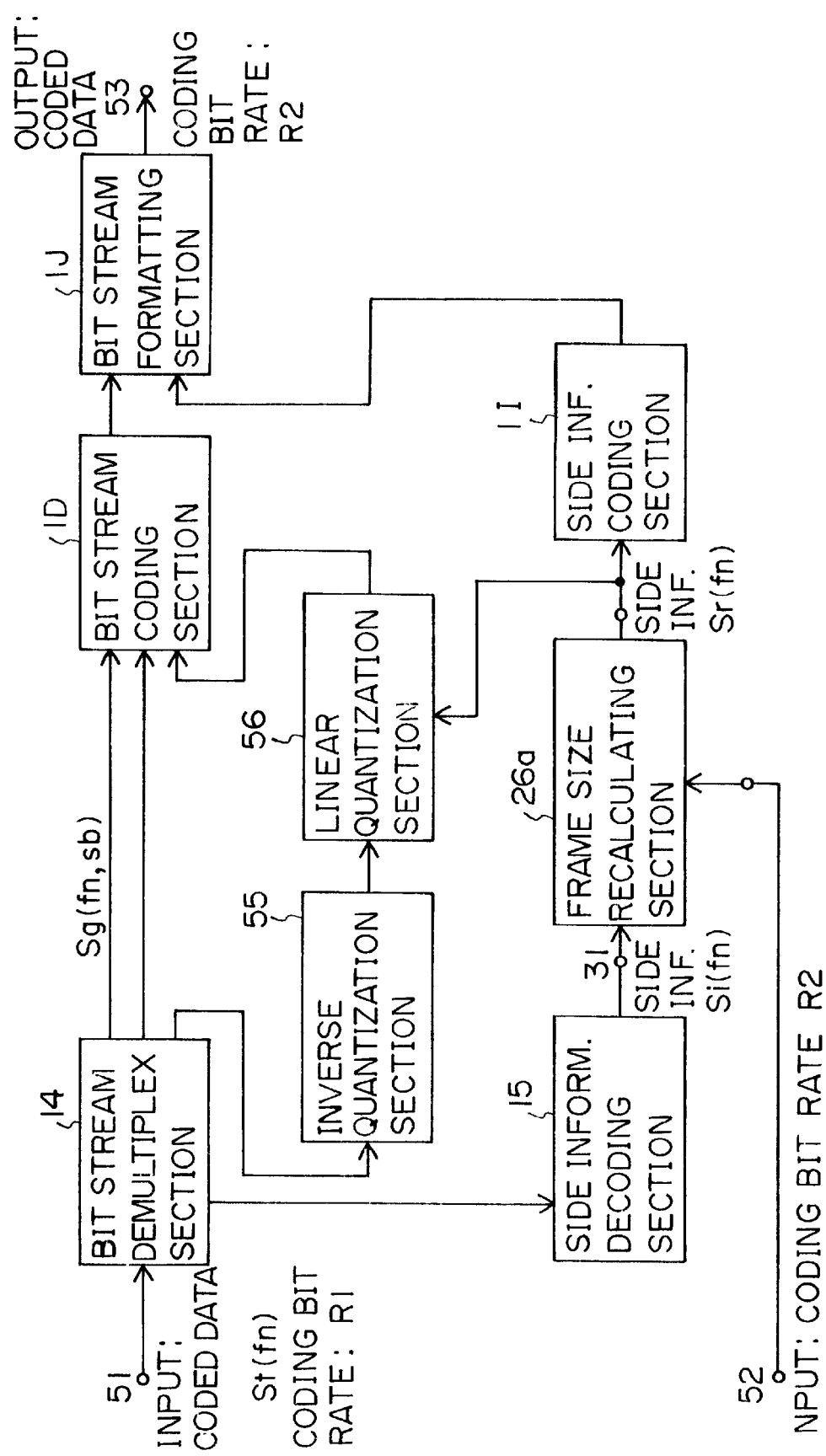
FIG. 3 is a block diagram illustrating circuit constructure for use in second, fourth, fifth and sixth embodiments of the coding bit rate converting apparatus according to the present invention.
Figure 6:
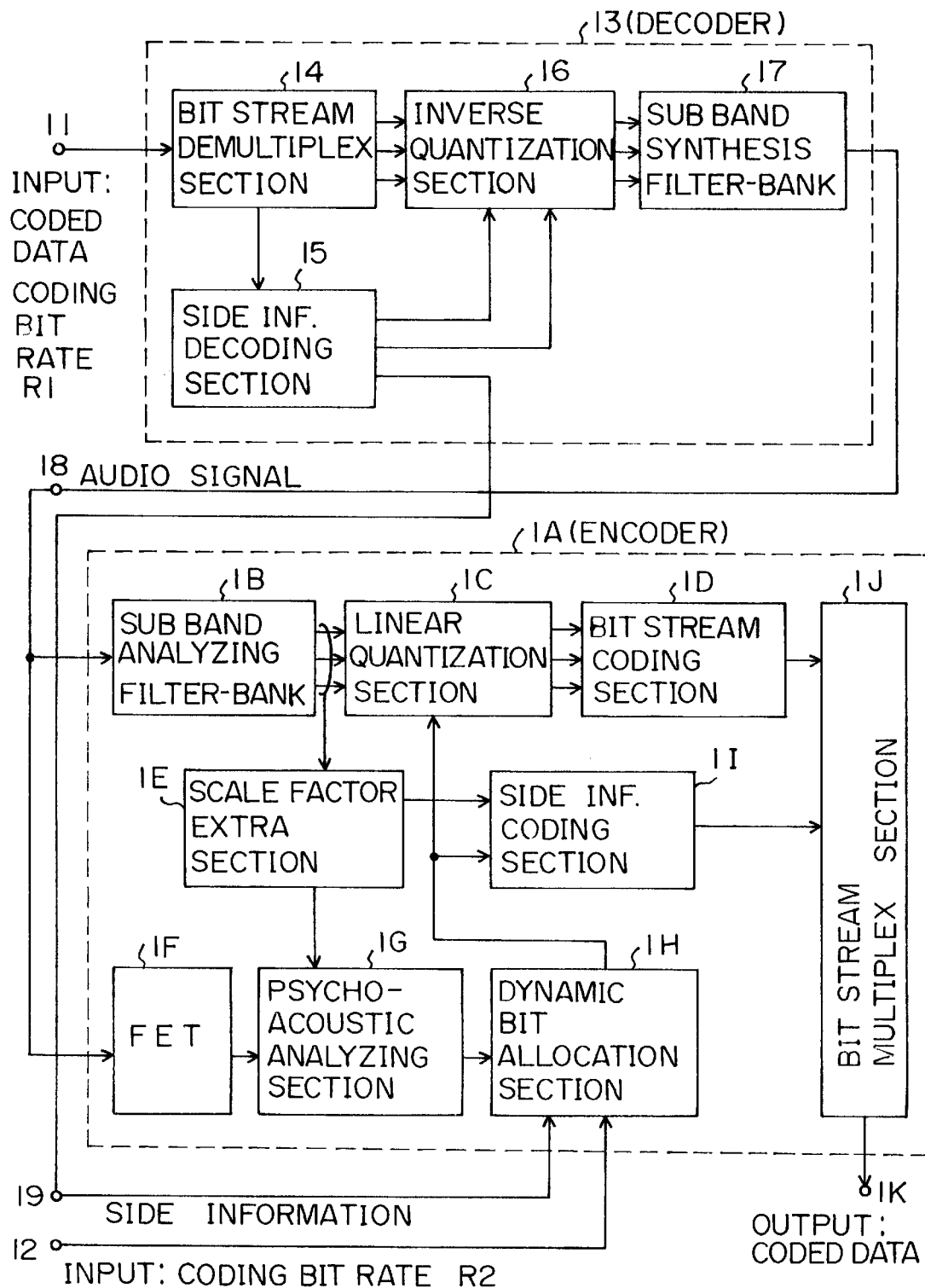
FIG. 6 is a block diagram showing the configuration of a conventional coding bit rate converting apparatus which once decodes coded audio signal to the original audio signal and then recodes it at a new coding bit rate.

Turning next to FIG. 3, a second embodiment of the present invention will be described. In FIG. 3, the same reference numerals as those in FIG. 1 denote parts identical or similar to those in the latter.

In FIG. 3, audio data St(fn) coded at the coding rate RI, input via a coded data input terminal 51, is first subjected to the bit stream demultiplexing in the bit stream demultiplexing section 14 to obtain the code string indicating the signal information Sg(fn,sb) of each band represented in bit form and the code string indicating side information such as the bit allocation Ba(fn,sb) of each band associated with the signal information. The code string representing the side information is decoded by the side information decoding section 15 into side information Si(fn).

Based on the decoded bit allocation information and the coding bit rate R2 input via a target coding bit rate input terminal 52, the bit allocation Br(fn,sb) for each band, which satisfies the coding bit rate R2, is calculated in a frame size recalculating section 26a (described later in detail). The bit allocation information Br of each band thus obtained and coding information of the original coded audio data are used to produce, in the side information coding section 1I, a code string representing new side information about coded voice.

Based on the new bit allocation information Br(fn,sb) for each band, only the signal information Sg(fn,sb) of those of the bands represented in bit form, obtained in the bit stream demultiplexing section 14, whose quantization steps differ from those in their original code strings are each dequantized in a dequantizing section 55 and then requantized in a linear quantizing section 56 using a new quantization step. In connection with the bands wherein the number of quantization steps is zero, the signal information can be directly updated intact in coded form without going through the dequantization and requantization steps when it is subjected to the bit stream coding processing in the bit stream coding section 1D.

The signal information updated using the new bit allocation information Br(fn,sb) is provided via the bit stream coding section 1D to the bit stream formatting section 1J, wherein it is constituted into a code string of the frame structure, together with the previously coded side information Sr(fn), and the code string is output via a coded data output terminal 53.

Incidentally, the bit stream demultiplexing section 14, the side information decoding section 15 and the dequantizing section 55 can adopt the same system as that used in a decoder pursuant to the MPEG system. The linear quantizing section 56, the bit stream coding section ID and the bit stream formatting section 1J can use the same system as that used in the encoder pursuant to the MPEG system.

A detailed description will be given, with reference to the block diagram of FIG. 2, of the frame size recalculating section 26 in the second embodiment. In FIG. 2 the same reference numerals as those in FIG. 3 denote parts identical or similar to those in the latter. To the side information input terminal 31 in FIG. 2 is fed the side information Si(fn) about coding conditions of input coded audio data. This side information contains, for instance, code assignment information Ba(fn,sb) on each band of the currently processed frame prior to the coding bit rate conversion. The current frame size Sa is calculated from the side information in the first frame size calculating section 33 and output therefrom. In the second frame size calculating section 35, the target frame size Sb is calculated from the side information Si(fn) input via the input terminal 31 and the target coding bit rate R2 input via the input terminal 32.

The bit allocation modifying section 34 compares the current frame size Sa with the target frame size Sb input thereinto.

When Sa≦Sb, it is assumed that bit allocation information has been modified for conversion to the target coding bit rate, and the updated bit allocation information Br(fn,sb) of each band and the associated side information are updated, and the side information Sr(fn) is output via the output terminal 36.

When Sa>Sb, the current frame size is larger than the frame size in the case of the coding bit rate being lower than the target bit rate R2, and consequently the frame size needs to be further reduced. In this example, the number of quantization steps for code assignment of the highest-frequency one of the bit-allocated bands is reduced by one. Then, the updated bit allocation information Ba(fn,sb) is input into the second frame size calculating section 35, wherein the frame size is calculated again (i→ii in FIG. 5(b)).

When Sa≦Sb as the result of the calculation, it is assumed that bit allocation processing has been completed, and the updated side information Sr(fn) is output via the side information output terminal 36. If the result of the calculation is Sa>Sb, the frame size needs to be further reduced and processing is performed to decrease by one the number of quantization steps in the highest one of the currently bit-allocated bands. Then, the updated bit allocation information Ba(fn,sb) is input again into the second frame size calculating section 35 for recalculation of the frame size (ii→iii in FIG. 5(b)). This processing is repeated as long as Sa>Sb. Accordingly, the number of quantization steps is reduced in a descending order of subband frequency.

As compared with the first embodiment, the second embodiment involves dequantization and requantization of the coded subband audio data, but since the band which is required to be subjected to this processing is limited specifically to the highest one of the bit-allocated subbands in the channel concerned, it is possible to achieve good audio quality and efficient bit allocation with no marked increase in the computational complexity.

(Embodiment 3)

Figure 4:
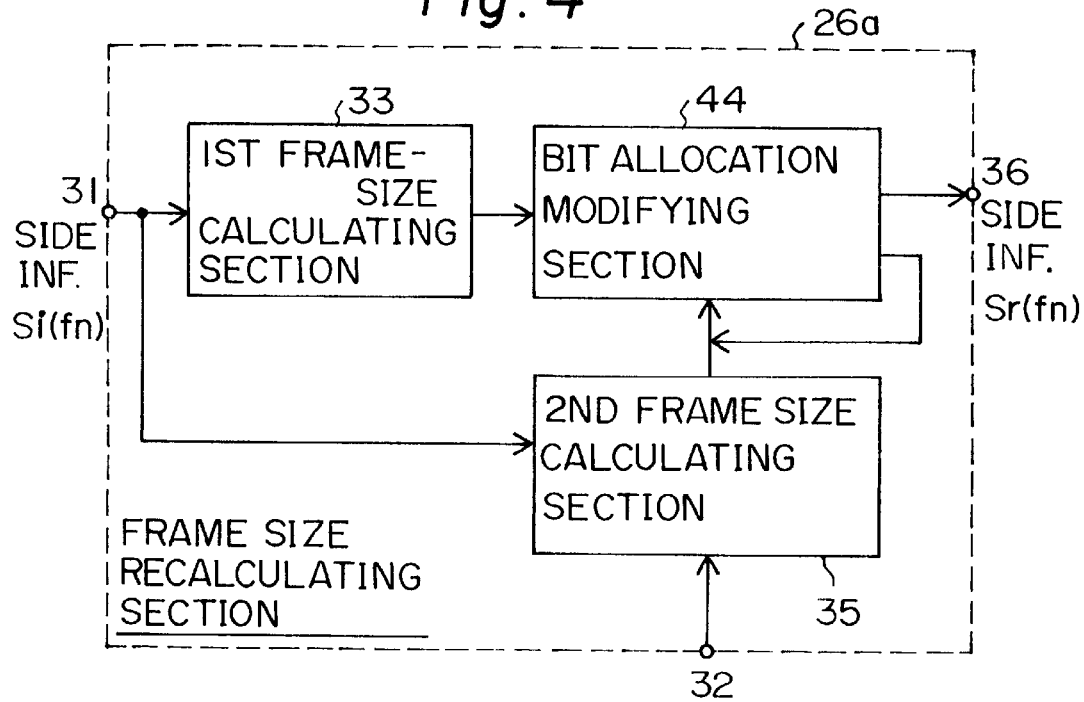
FIG. 4 is a block diagram illustrating in detail the configuration of a frame size recalculating section adoptable in third, fourth, fifth and sixth embodiments of the present invention.

Referring next to FIG. 4, a third embodiment of the present invention will be described. In FIG. 4, the same reference numerals as those in FIG. 1 denote parts identical or similar to those in the latter. FIG. 4 is a block diagram illustrating in detail the frame size recalculating section 26a for use in the third embodiment. This embodiment is common in construction to the first embodiment of FIG. 1 except the frame size recalculating section of FIG. 4.

The side information Si(fn) about coding conditions of input coded audio data is fed to the side information input terminal 31 in FIG. 4. This side information contains, for instance, bit allocation information Ba(fn,sb) on each band of the currently processed frame prior to the coding bit rate conversion. The current frame size Sa is calculated from the side information in the first frame size calculating section 33 and output therefrom. In the second frame size calculating section 35, the target frame size Sb is calculated from the side information Si(fn) input via the input terminal 31 and the target coding bit rate R2 input via the input terminal 32.

A bit allocation modifying section 44 compares the current frame size Sa and the target frame size Sb input thereinto.

When Sa≦Sb, it is assumed that code allocation information has been modified for conversion to the target coding rate, and the updated bit allocation information Br(fn,sb) of each band and the associated side information are updated, and the side information Sr(fn) is output via the output terminal 36.

When Sa>Sb, the current frame size is larger than the frame size in the case of the coding bit rate below the target rate R2, and consequently the frame size needs to be further reduced. In MPEG the relationship between the number of quantization steps assigned to each band and the bit allocation thereto can be precalculated from specifications. Then, processing of (1) reducing the bit allocation of the high-frequency band to zero (ii in FIG. 5(a)), (2) calculating the frame size at that time from the bit allocation obtainable from the number of quantization steps, and (3) comparing the calculated frame size with the target frame size is repeated based on the above information until the current frame size becomes smaller than that corresponding to the target coding bit rate, i.e. Sa≦Sb is obtained (ii→iv in FIG. 5(a)).

As compared with the first and second embodiments, the third embodiment does not recalculate the frame size after changing the bit allocation to the band concerned but instead subtracts from the original frame size a precalculated code quantity corresponding to the change in the bit allocationt. This permits reduction of computational complexity.

(Embodiemnt 4)

Referring to FIG. 4, a fourth embodiment of the present invention will be described. In FIG. 4, the same reference numerals as those in FIG. 3 denote parts identical or similar to those in the latter. FIG. 4 is a block diagram illustrating in detail the frame size recalculating section 26a for use in the fourth embodiment. This embodiment is common in construction to the second embodiment of FIG. 3 except the frame size recalculating section of FIG. 4.

The side information Si(fn) about coding conditions of input coded audio data is fed to the side information input terminal 31 in FIG. 4. This side information contains, for instance, bit allocation information Ba(fn,sb) on each band of the currently processed frame prior to the coding bit rate conversion. The current frame size Sa is calculated from the side information Si(fn) in the first frame size calculating section 33 and output therefrom. In the second frame size calculating section 35, the target frame size Sb is calculated from the side information Si(fn) input via the input terminal 31 and the target coding bit rate R2 input via the input terminal 32.

The bit allocation modifying section 44 compares the current frame size Sa with the target frame size Sb input thereinto.

When Sa≦Sb, it is assumed that bit allocation information has been modified for conversion to the target coding bit rate, and the updated bit allocation information Br(fn,sb) of each band and the associated side information are updated, and the side information Sr(fn) is output via the output terminal 36.

When Sa>Sb, the current frame size is larger than the frame size corresponding to the coding rate below the target bit rate R2, and consequently the frame size needs to be further reduced. In MPEG the relationship between the number of quantization steps assigned to each band and the bit allocation thereto can be precalculated from specifications. Then, processing of (1) reducing the number of quantization steps of the high-frequency band by one (ii in FIG. 5(b)), (2) calculating the frame size at that time from the bit allocation obtainable from quantization step information, and (3) comparing the calculated frame size with the target one is repeated based on the above information until the current frame size becomes smaller than that corresponding to the target coding bit rate, i.e. Sa≦Sb is obtained (ii→iv in FIG. 5(b)).

As compared with the third embodiment, the fourth embodiment does not reduce the bit allocation for each band but instead reduces the number of quantization steps one by one, making it possible to achieve higher audio quality than in the third embodiment.

(Embodiment 5)

Turning back to FIG. 2, a fifth embodiment of the present invention will be described. FIG. 2 is a block diagram illustrating in detail the frame size recalculating section for use in the fifth embodiment. This embodiment is common in construction to the second embodiment of FIG. 3 except the frame size recalculating section. In FIG. 2, the same reference numerals as those in FIG. 3 denote parts identical or similar to those in the latter. The side information Si(fn) about coding conditions of input coded audio data is fed to the side information input terminal 31 in FIG. 2. This side information contains, for instance, bit allocation information Ba(fn,sb) on each band of the currently processed frame prior to the coding bit rate conversion. The current frame size Sa is calculated from the side information in the first frame size calculating section 33 and output therefrom. In the second frame size calculating section 35, the target frame size Sb is calculated from the side information Si(fn) input via the input terminal 31 and the target coding bit rate R2 input via the input terminal 32.

The bit allocation modifying section 34 compares the current frame size Sa with the target one Sb input thereinto.

When Sa≦Sb, it is assumed that bit allocation information has been modified for conversion to the target coding bit rate, and the updated bit allocation information Br(fn,sb) of each band and the associated side information are updated, and the side information Sr(fn) is output via the output terminal 36.

When Sa>Sb, the current frame size is larger than the frame size corresponding to the coding bit rate below the target bit rate R2, and consequently the frame size needs to be further reduced. In this example, the number of quantization steps in the bit allocation is reduced one by one for each bit-allocated subband. Let it be assumed, for example, that the quantization step number is "5" in band 1, "3" in band 2, "4" in band 3, "2" in band 4 and "3" in band 5. When the current frame size is smaller than the target one by reducing the quantization steps by six steps, such an operation as shown in Table 1 is performed.

TABLE 1

Example of Transition of Quantization Step Number in Embodiment 5

| | Band 1 | Band 2 | Band 3 | Band 4 | Band 5 |
|---|---|---|---|---|---|
| Before Conv. | 5 | 3 | 4 | 2 | 3 |
| Step 1 | 5 | 3 | 4 | 2 | 2 |
| Step 2 | 5 | 3 | 4 | 1 | 2 |
| Step 3 | 5 | 3 | 3 | 1 | 2 |
| Step 4 | 5 | 2 | 3 | 1 | 2 |
| Step 5 | 4 | 2 | 3 | 1 | 2 |
| Step 6 | 4 | 2 | 3 | 1 | 1 |

As shown above in Table 1, the quantization step number is reduced by one step in a sequential order from higher to lower frequency bands (ii→iii in FIG. 5(c)). When reduced by one step in each band, the quantization step number is reduced again in descending order of subband frequency. And, upon each one-step reduction of the quantization step number, updated bit allocation information Ba(fn,sb) is input into the second frame size calculating section 35 to recalculate the frame size. The above processing is repeated as long as Sa>Sb.

In the first through fourth embodiments, no manipulation of bit allocation information on the low-frequency band, determined by the high coding rate, results in an excessive bit allocation to the low-frequency band, but this embodiment reduces the bit allocation uniformly from all the bands, and hence achieves good audio quality.

As a modified form of the fifth embodiment, it is also possible to precalculate the bit allocation for each quantization step, as the cases of the third and fourth embodiments, and use the information to calculate the current frame size from the original one for each time the quantization step number is reduced by one step for each band as in this embodiment.

(Embodiment 6)

With reference to FIG. 2, a sixth embodiment of the present invention will be described. FIG. 2 is a block diagram illustrating in detail the frame size recalculating section 26 for use in the sixth embodiment. This embodiment is common in construction to the second embodiment of FIG. 3 except the frame size recalculating section. In FIG. 2, the same reference numerals as those in FIG. 3 denote parts identical or similar to those in the latter. The side information Si(fn) about coding conditions of input coded audio data is fed to the side information input terminal 31 in FIG. 2. This side information contains, for instance, bit allocation information Ba(fn,sb) on each band of the currently processed frame prior to the coding bit rate conversion. The current frame size Sa is calculated from the side information in the first frame size calculating section 33 and output therefrom. In the second frame size calculating section 35, the target frame size Sb is calculated from the side information Si(fn) input via the input terminal 31 and the target coding bit rate R2 input via the input terminal 32.

The bit allocation modifying section 34 compares the current frame size Sa with the target one Sb input thereinto.

When Sa≦Sb, it is assumed that bit allocation information has been modified for conversion to the target coding bit rate, and the updated bit allocation information Br(fn,sb) of each band and the associated side information are updated, and the side information Sr(fn) is output via the output terminal 36.

When Sa>Sb, the current frame size is larger than the frame size corresponding to the coding bit rate below the target bit rate R2, and consequently the frame size needs to be further reduced. This embodiment adopts an idea of utilizing a mask-to-noise ratio which is used for bit allocation in MPEG coding. The MPEG coding performs bit allocation by a method according to which the value of the mask-to-noise ratio MNR, calculated based on a psycho-acoustic analysis, becomes as constant over the respective bands as possible in the MPEG coding. The mask-to-noise ratio MNR is calculated by the following equation (1).

$$MNR = SNR - SMR \quad (1)$$

where SNR is a signal-to-noise ratio, which is calculated from the quantization step, and SMR is a signal-to-mask ratio, which is calculated from the input signal and a mask value defined by a psycho-acoustic model. Since the SMR value is not contained in the coded data, however, it cannot be obtained from the coded data. The same goes for the MNR value.

In the sixth embodiment, the MNR value is set at a provisional one on the assumption that it is constant over all the bands, and the provisional MNR value is caused to reflect a variation in the SNR value which is caused by changing the quantization step number, thereby performing optimum bit allocation processing (FIG. 5(d)).

Let it be assumed, for example, that the quantization step number is "5" in the band 1, "3" in the band 2, "4" in the band 3, "2" in the band 4 and "3" in the band 5 and that the SNR value is "7" when the quantization step number is 1, "16" when the quantization step number is 2, "25.28" when the quantization step number is 3, "37.59" when the quantization step number is 4 and "37.75" when the quantization step number is 5. By a six-step reduction of the quantization step numbers, such processing as shown below in Tables 2 and 3 takes place when the current frame size is smaller than the target one.

TABLE 2

Example of Transition of Quantization Step Number in Embodiment 6

| | Band 1 | Band 2 | Band 3 | Band 4 | Band 5 |
|---|---|---|---|---|---|
| Before Conv. | 5 | 3 | 4 | 2 | 3 |
| Step 1 | 4 | 3 | 4 | 2 | 3 |
| Step 2 | 4 | 3 | 3 | 2 | 3 |
| Step 3 | 4 | 3 | 3 | 1 | 3 |
| Step 4 | 4 | 3 | 3 | 1 | 2 |
| Step 5 | 4 | 2 | 3 | 1 | 2 |
| Step 6 | 3 | 2 | 3 | 1 | 2 |

TABLE 3

Example of MNR Transition in Embodiment 6

| | Band 1 | Band 2 | Band 3 | Band 4 | Band 5 |
|---|---|---|---|---|---|
| Before Conv. | 0 | 0 | 0 | 0 | 0 |
| Step 1 | −6.16 | 0 | 0 | 0 | 0 |
| Step 2 | −6.16 | 0 | −6.38 | 0 | 0 |
| Step 3 | −6.16 | 0 | −6.38 | −9 | 0 |
| Step 4 | −6.16 | 0 | −6.38 | −9 | −9.28 |
| Step 5 | −6.16 | −9.28 | −6.38 | −9 | −9.28 |
| Step 6 | −12.54 | −9.28 | −6.38 | −9 | −9.28 |

To begin with, the provisional MNR values of all the bands are made zero.

To reduce the quantization step number:

(1) The quantization step number of the band with the largest provisional MNR value is reduced.

(2) When a plurality of candidates are found, the quantization step number is reduced in the band of the smaller value of reduction.

(3) When a plurality of candidates still remain, the quantization step number is reduced in the band of higher frequency. Accordingly, in the examples of Tables 2 and 3, as the result of the first stage processing, the quantization step number of the band 1 is 4 (Table 2) and the MNR of the band 1 is −6.16 (Table 3). Similarly, the quantization step number is reduced in the second and subsequent steps.

Upon each reduction of the quantization step number, updated bit allocation information Ba(fn,sb) is input into the first frame size calculating section 33 to recalculate the frame size Sa. Since the sixth embodiment performs the coding bit rate conversion the basis of a method close to the bit allocation system intended primarily for MPEG, it is possible to obtain coded audio data of higher quality than in the cases of the first to fifth embodiments.

As a modified form of the sixth embodiment, it is also possible to precalculate the bit allocation for each quantization step and use the information to calculate the current frame size from the original one for each time the quantization step number is reduced by one step for each band as in this embodiment.

As will be seen from the above, according to the present invention, since the coding bit rate is converted mainly on the basis of the idea of using the quantizer and dequantizer, there is no need of processing for subband analysis and synthesis which involve a very large computational load as in the existing system, and a large-capacity memory need not be used; hence, the invention can be realized with a simple structure. Its performance is also comparable to that of the conventional system which recodes the coded audio data after once decoding it to the original audio signal.

The present invention was applied to processing of audio coded by the MPEG system. In the cases of the first through fourth embodiments, the audio quality was substantially equal to that which would be obtainable when the coded audio data would be recoded at about 70% of the intended or target coding bit rate. In the cases of the fifth and sixth embodiments, the audio quality obtained was substantially equal to that when the coded audio data would be recoded at the target coding bit rate. Further, in the case of the sixth embodiment which involves the largest computational complexity, too, processing could be done less than ⅙ the actual reproduction time through the use of a workstation of about 130 MIPS.

What we claim is:

1. A method of further converting input compressed audio bitstream, already compressed at lower bit rate than that of originally digitized raw audio data, to output coded bitstream with coding bit rate lower than a target coding bit rate and different coding bit rate from that of said input compressed audio bitstream, characterized in:

that a control output is taken out a control output from said input compressed audio bitstream without reconstructing said raw audio data when the frame size of said input compressed audio bitstream is larger than the frame size determined by said target coding bit rate; and that said output coded bitstream is provided as a bit rate-converted bitstream by controlling a parameter defining the frame size of said input compressed audio bitstream by the use of said control output in a predetermined procedure until the frame size of said input compressed audio bitstream data becomes smaller than the frame size determined by said target coding bit rate.

2. A method of further converting input compressed audio bitstream, already compressed at lower bit rate than that of originally digitized raw audio data, to output coded bitstream with coding bit rate lower than a target coding bit rate and different coding bit rate from that of said input compressed audio bitstream characterized in:

that a control output is taken out a control output from said input compressed audio bitstream without reconstructing said raw audio data when the frame size of said input compressed audio bitstream is larger than the frame size determined by said target coding bit rate;

that said output coded bitstream is provided as a bit rate—converted bitstream by controlling a parameter defining the frame size of said input compressed audio bitstream by the use of said control output in a predetermined procedure until the frame size of said input compressed audio bitstream data becomes smaller than the frame size determined by said target coding bit rate; and that said parameter is the number of bits assigned to each of a plurality of frequency bands extracted from said input compressed audio bitstream and that said number of bits are directly reduced from said input compressed audio bitstream.

3. A method of further converting input compressed audio bitstream, already compressed at lower bit rate than that of originally digitized raw audio data, to output coded bitstream with coding bit rate lower than a target coding bit rate and different coding bit rate from that of said input compressed audio bitstream, characterized in:

that a control output is taken out a from said input compressed audio bitstream without reconstructing said raw audio data when the frame size of said input compressed audio bitstream is larger than the frame size determined by said target coding bit rate;

that said output coded bitstream is provided as a bit rate-converted bitstream by controlling a parameter defining the frame size of said input compressed audio bitstream by the use of said control output in a predetermined procedure until the frame size of said input compressed audio bitstream data becomes smaller than the frame size determined by said target coding bit rate; and that said parameter is the number of bits assigned to each of a plurality of frequency bands extracted from said input compressed audio bitstream, and that said predetermined procedure is defined to reduce said number of bits assigned to said plurality of frequency bands in descending order of frequency bands.

4. A method of further converting input compressed audio bitstream, already compressed at lower bit rate than that of originally digitized raw audio data, to output coded bitstream with coding bit rate lower than a target coding bit rate and different coding bit rate from that of said input compressed audio bitstream, characterized in:

that a control output is taken out from said input compressed audio bitstream without reconstructing said raw audio data when the frame size of said input compressed audio bitstream is larger than the frame size determined by said target coding bit rate;

that said output coded bitstream is provided as a bit rate-converted bitstream by controlling a parameter defining the frame size of said input compressed audio bitstream by the use of said control output in a predetermined procedure until the frame size of said input compressed audio bitstream data becomes smaller than the frame size determined by said target coding bit rate; and that said parameter is the number of quantization steps in each of a plurality of frequency bands extracted from said input compressed audio bitstream, and that said predetermined procedure is defined to reduce said number of quantization steps in selected ones of a plurality of said frequency bands of said input compressed audio bitstream.

5. A coding bit rate converting method of compressing audio bitstream according to claim 4, characterized in that said predetermined procedure is determined so that said number of quantization steps extracted from said input compressed audio bitstream is reduced uniformly for all of said plural frequency bands.

6. A coding bit rate converting method of compressing audio bitstream according to claim 4, characterized in that said predetermined procedure is determined so that said number of quantization steps extracted from said input compressed audio bitstream is reduced unit step by unit step for each of said selected frequency band.

7. A coding bit rate converting method of compressing audio bitstream according to claim 4, characterized in that said predetermined order of selection is defined to select a plurality of said frequency bands in the order of higher to lower frequency bands.

8. A coding bit rate converting method of compressing audio bitstream according to claim 4, characterized in that said predetermined order of selection is defined to select a plurality of said frequency bands in accordance with a mask-to-noise ratio predicted from at least said number of quantization steps extracted from said input compressed audio bitstream.

9. A method of further converting input compressed audio bitstream, already compressed at lower bit rate than that of originally digitized raw audio data, to output coded bitstream with coding bit rate lower than a target coding bit rate and different coding bit rate from that of said input compressed audio bitstream, characterized in:

that a control output is taken out from said input compressed audio bitstream without reconstructing said raw audio data when the frame size of said input compressed audio bitstream is larger than the frame size determined by said target coding bit rate;

that said output coded bitstream is provided as a bit rate—converted bitstream by controlling a parameter defining the frame size of said input compressed audio bitstream by the use of said control output in a predetermined procedure until the frame size determined by said target coding bit rate; and that said parameter is the number of quantization bits for each quantization step in a plurality of frequency bands extracted from said input compressed audio bitstream, and that said predetermined procedure is defined to reduce said number of bits allocated to said quantization step in selected ones of a plurality of said frequency bands in a predetermined order of selection.

10. A coding bit rate converting method of compressing audio bitstream according to claim 9, characterized in that said predetermined order of selection is defined to select a plurality of said frequency bands in the order of higher to lower frequency bands.

11. A coding bit rate converting method of compressing audio bitstream according to claim 9, characterized in that said predetermined order of selection is defined to select a plurality of said frequency bands in accordance with a mask-to-noise ratio assumed by at least said number of quantization steps.

12. An apparatus for further converting input compressed audio data, already compressed at lower bit rate than that of originally digitized raw audio data, to output coded bitstream, with coding bit rate lower than a target coding bit rate and different coding bit rate from that of said input compressed audio bitstream, characterized by:

comparison means for taking out a control output from said input compressed audio bitstream without reconstructing said raw audio data when the frame size of said input compressed audio bitstream is larger than the frame size determined by said target coding bit rate; and converting means for providing said output coded bitstream as a bit rate-converted bitstream by controlling a parameter defining the frame size of said input compressed audio bitstream by the use of said control output in a predetermined procedure until the frame size of said input compressed audio bitstream becomes smaller than the frame size determined by said tav~get coding bit rate.

13. An apparatus for further converting input compressed audio data, already compressed at lower bit rate than that of originally digitized raw audio data, to output coded bitstream with coding bit rate lower than a target coding bit rate and different coding bit rate from that of said input compressed audio bitstream, characterized by:

comparison means for taking out a control output from said input compressed audio bitstream without reconstructing said raw audio data when the frame size of said input compressed audio bitstream is larger than the frame size determined by said target coding bit rate; and converting means for providing said output coded bitstream, as a bit rate-converted bitstream by controlling a parameter defining the frame size of said input compressed audio bitstream by the use of said control output in a predetermined procedure until the frame size of said input compressed audio bitstream becomes smaller than the frame size determined by said target coding bit rate, said converting means being constructed so that said parameter is the number of bits assigned to each of a plurality of frequency bands extracted from said input compressed audio bitstream and that number of bits are directly reduced from said input compressed audio bitstream.

14. An apparatus for further converting input compressed audio data, already compressed at lower bit rate than that of originally digitized raw audio data, to output coded bitstream with coding bit rate lower than a target coding bit rate and different coding bit rate from that of said input compressed audio bitstream, characterized by:

comparison means for taking out a control output from said input compressed audio bitstream without reconstructing said raw audio data when the frame size of said input compressed audio bitstream is larger than the frame size deterined by said target coding bit rate; and converting means for providing said output coded bitstream as a bit rate-converted bitstream by controlling a parameter defining the frame size of said input compressed audio bitstream by the use of said control output in a predetermined procedure until the frame size of said input compressed audio bitstream becomes smaller than the frame size determined by said target coding bit rate;

said converting means being constructed so that said parameter is the number of bits assigned to each of a plurality of frequency bands extracted from said input compressed audio bitstream and that said predetermined procedure is defined to reduce said number of bits assigned to a plurality of said frequency bands in order of higher to lower frequency bands.

15. An apparatus for further converting input compressed audio data, already compressed at lower bit rate than that of originally digitized raw audio data, to output coded bitstream with coding bit rate lower than a target coding bit rate and different coding bit rate from that of said input compressed audio bitstream characterized by:

comparison means for taking out a control output from said input compressed audio bitstream without reconstructing said raw audio data when the frame size of said input compressed audio bitstream is larger than the frame size determined by said target coding bit rate; and converting means for providing said output coded bitstream as a bit rate-converted bitstream by controlling a parameter defining the frame size of said input compressed audio bitstream by the use of said control output in a predetermined procedure until the frame size of said input compressed audio bitstream becomes smaller than the frame size determined by said target coding bit rate;

said converting means being constructed so that said parameter is the number of quantization steps in each of a plurality of frequency bands extracted from said input compressed audio bitstream ,and that said predetermined procedure is defined to reduce said number of quantization steps in selected ones of a plurality of said frequency bands of said input compressed audio bitstream.

16. A coding bit rate converting apparatus for compressed audio bitstream according to claim 15, characterized in that said predetermined procedure is determined so that said number of quantization steps extracted from said input compressed audio bitstream is reduced uniformly for all of said plural frequency bands.

17. A coding bit rate converting apparatus for compressed audio bitstream according to claim 15, characterized in that said predetermined procedure is determined so that said number of quantization steps extracted from said input compressed audio bitstream is reduced unit step by unit step for each of said selected frequency band.

18. A coding bit rate converting apparatus for compressed audio bitstream according to claim 15, characterized in that said predetermined order of selection is defined to select a plurality of said frequency bands in the order of higher to lower frequency bands.

19. A coding bit rate converting apparatus for compressed audio bitstream according to claim 15, characterized in that said predetermined order of selection is defined to select a plurality of said frequency bands in accordance with a mask-to—noise ratio predicted from at least said number of quantization steps extracted from said input compressed audio bitstream.

20. An apparatus for further converting input compressed audio data, already compressed at lower bit rate than that of originally digitized raw audio data, to output coded bitstream with coding bit rate lower than a target coding bit rate and different coding bit rate from that of said input compressed audio bitstream, characterized by:

comparison means for taking out a control output from said input compressed audio bitstream without reconstructing said raw audio data when the frame size of said input compressed audio bitstream is larger than the frame size determined by said target coding bit rate; and converting means for providing said output coded bitstream as a bit rate-converted bitstream by controlling a parameter defining the frame size of said input compressed audio bitstream by the use of said control output in a predetermined procedure until the frame size of said input compressed audio bitstream becomes smaller than the frame size determined by said target coding bit rate;

said converting means being constructed so that said parameter is the number of quantization bits for each quantization step in a plurality of frequency bands extracted from said input compressed audio bitstream, and that said predetermined procedure is defined to reduce said number of bits allocated for said quantization step in selected ones of a plurality of said frequency bands in a predetermined order of selection.

21. A coding bit rate converting apparatus for compressed audio bitstream according to claim 20, characterized in that said predetermined order of selection is defined to select a plurality of said frequency bands in the order of higher to lower frequency bands.

22. A coding bit rate converting apparatus for compressed audio bitstream according to claim 20, characterized in that said predetermined order of selection is defined to select a plurality of said frequency bands in accordance with a mask-to-noise ratio assumed by at least said number of quantization steps.

* * * * *